United States Patent
Chung et al.

(10) Patent No.: US 12,475,908 B2
(45) Date of Patent: Nov. 18, 2025

(54) ELECTRONIC DEVICE PROVIDING VARYING RESPONSE BASED ON CONTENTS INCLUDED IN INPUT, AND METHOD AND COMPUTER READABLE MEDIUM THEREOF

(71) Applicant: SAMSUNG ELECTRONICS CO., LTD., Suwon-si (KR)

(72) Inventors: Ji-hye Chung, Seoul (KR); Cheong-jae Lee, Suwon-si (KR); Hye-jeong Lee, Seoul (KR); Yong-wook Shin, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/512,348

(22) Filed: Nov. 17, 2023

(65) Prior Publication Data

US 2024/0096345 A1    Mar. 21, 2024

Related U.S. Application Data

(63) Continuation of application No. 17/112,170, filed on Dec. 4, 2020, now Pat. No. 11,854,570, which is a
(Continued)

(30) Foreign Application Priority Data

Jan. 7, 2013    (KR) .......................... 10-2013-0001829

(51) Int. Cl.
| | |
|---|---|
| *G10L 21/06* | (2013.01) |
| *G10L 15/22* | (2006.01) |
| *H04M 3/493* | (2006.01) |

(52) U.S. Cl.
CPC .............. *G10L 21/06* (2013.01); *G10L 15/22* (2013.01); *H04M 3/4936* (2013.01); *G10L 2015/223* (2013.01); *H04M 2203/355* (2013.01)

(58) Field of Classification Search
CPC .............. H04M 3/4936; H04M 3/492; H04M 2203/355; G10L 2015/223;
(Continued)

(56) References Cited

U.S. PATENT DOCUMENTS

| | | |
|---|---|---|
| 6,233,561 B1 | 5/2001 | Junqua et al. |
| 6,275,788 B1 | 8/2001 | Watanabe et al. |

(Continued)

FOREIGN PATENT DOCUMENTS

| | | |
|---|---|---|
| AU | 2009267543 A1 | 1/2010 |
| CA | 2045959 C | 4/1996 |

(Continued)

OTHER PUBLICATIONS

Communication dated Aug. 31, 2021, issued by the State Intellectual Property Office of P.R. China in counterpart Chinese Application No. 201710749861.3.

(Continued)

*Primary Examiner* — Michael N Opsasnick
(74) *Attorney, Agent, or Firm* — Sughrue Mion, PLLC

(57) ABSTRACT

An electronic apparatus, method, and computer readable medium are provided. The electronic apparatus includes a communicator, and a controller. The controller, based on a first voice input being received, controls the communicator to receive data including first response information corresponding to the first voice input from a server, and outputs the first response information on a display, and based on a second voice input being received, controls the communicator to receive data including second response information
(Continued)

corresponding to the second voice input from the server, and outputs the second response information on the display. Based on whether the second voice input is received within a predetermined time from a time corresponding to the output of the first response information, whether a use of utterance history information is identified, and the second response information is displayed differently based on whether the second voice input is received within the predetermined time.

18 Claims, 7 Drawing Sheets

Related U.S. Application Data continuation of application No. 14/149,296, filed on Jan. 7, 2014, now Pat. No. 10,891,968.

(58) Field of Classification Search
CPC ......... G10L 2015/225; G10L 2015/228; G10L 15/22; G10L 2015/221; G10L 2015/226; G10L 2015/227
See application file for complete search history.

(56) References Cited

U.S. PATENT DOCUMENTS

| | | |
|---|---|---|
| 6,314,398 B1 | 11/2001 | Junqua et al. |
| 6,456,978 B1 | 9/2002 | Wymore et al. |
| 6,567,805 B1 | 5/2003 | Johnson et al. |
| 6,622,119 B1 | 9/2003 | Ramaswamy et al. |
| 7,426,467 B2 | 9/2008 | Nashida et al. |
| 7,502,738 B2 | 3/2009 | Kennewick et al. |
| 7,716,056 B2 | 5/2010 | Weng et al. |
| 7,805,304 B2 | 9/2010 | Washio |
| 7,890,329 B2 | 2/2011 | Wu et al. |
| 8,055,243 B2 | 11/2011 | Li |
| 8,073,681 B2 | 12/2011 | Baldwin et al. |
| 8,130,918 B1 | 3/2012 | Zirngibl et al. |
| 8,204,751 B1 | 6/2012 | Di Fabbrizio et al. |
| 8,407,051 B2 | 3/2013 | Inoue et al. |
| 8,515,765 B2 | 8/2013 | Baldwin et al. |
| 9,015,049 B2 | 4/2015 | Baldwin et al. |
| 10,891,968 B2* | 1/2021 | Chung ............... H04M 3/4936 |
| 11,854,570 B2* | 12/2023 | Chung ............... H04M 3/4936 |
| 2002/0156629 A1 | 10/2002 | Carberry et al. |
| 2002/0198714 A1* | 12/2002 | Zhou ................. G10L 15/1822 704/252 |
| 2002/0198722 A1 | 12/2002 | Yuschik |
| 2003/0235183 A1 | 12/2003 | Skelton et al. |
| 2004/0010410 A1 | 1/2004 | Oh et al. |
| 2004/0044516 A1 | 3/2004 | Kennewick et al. |
| 2004/0045040 A1 | 3/2004 | Hayward |
| 2004/0236778 A1* | 11/2004 | Junqua ................ G06F 16/40 348/E5.103 |
| 2005/0149326 A1 | 7/2005 | Hogengout et al. |
| 2005/0288063 A1 | 12/2005 | Seo et al. |
| 2006/0074670 A1 | 4/2006 | Weng et al. |
| 2006/0074671 A1 | 4/2006 | Farmaner et al. |
| 2006/0075429 A1 | 4/2006 | Istvan et al. |
| 2007/0121596 A1 | 5/2007 | Kurapati et al. |
| 2007/0225982 A1 | 9/2007 | Washio |
| 2007/0263841 A1 | 11/2007 | Li |
| 2007/0294721 A1 | 12/2007 | Haeuser et al. |
| 2008/0091406 A1 | 4/2008 | Baldwin et al. |
| 2008/0183852 A1 | 7/2008 | Pramer et al. |
| 2008/0201306 A1 | 8/2008 | Cooper et al. |
| 2008/0294637 A1 | 11/2008 | Liu |
| 2008/0313039 A1 | 12/2008 | Altberg et al. |
| 2009/0006541 A1 | 1/2009 | Baba et al. |
| 2009/0018832 A1 | 1/2009 | Mukaigaito et al. |
| 2009/0031382 A1 | 1/2009 | Cope |
| 2009/0192802 A1 | 7/2009 | Nagaraja et al. |
| 2010/0146411 A1* | 6/2010 | Burnett ................. G06F 16/958 715/781 |
| 2011/0181683 A1 | 7/2011 | Nam |
| 2011/0191099 A1 | 8/2011 | Farmaner et al. |
| 2011/0208525 A1 | 8/2011 | Inoue et al. |
| 2011/0227911 A1 | 9/2011 | Joo et al. |
| 2011/0246190 A1 | 10/2011 | Suzuki et al. |
| 2011/0292188 A1 | 12/2011 | Yamaguchi |
| 2011/0301955 A1 | 12/2011 | Byrne et al. |
| 2011/0313775 A1* | 12/2011 | Laligand ........ H04N 21/234336 704/E11.001 |
| 2012/0016678 A1 | 1/2012 | Gruber et al. |
| 2012/0022857 A1 | 1/2012 | Baldwin et al. |
| 2012/0022872 A1 | 1/2012 | Gruber et al. |
| 2012/0087637 A1 | 4/2012 | Logan et al. |
| 2012/0121077 A1* | 5/2012 | Gabay ................. H04L 65/1096 704/E15.001 |
| 2012/0131609 A1 | 5/2012 | Fernandez Gutierrez et al. |
| 2012/0131626 A1 | 5/2012 | Fernandez Gutierrez |
| 2012/0154255 A1 | 6/2012 | Hinckley et al. |
| 2012/0176313 A1 | 7/2012 | Ryu et al. |
| 2012/0179473 A1 | 7/2012 | Yano |
| 2012/0265528 A1* | 10/2012 | Gruber ................. G10L 15/183 704/235 |
| 2013/0018659 A1 | 1/2013 | Chi |
| 2013/0321340 A1 | 12/2013 | Seo et al. |
| 2013/0339022 A1 | 12/2013 | Baldwin et al. |
| 2014/0095171 A1 | 4/2014 | Lynch et al. |
| 2014/0195249 A1 | 7/2014 | Chung et al. |
| 2015/0228276 A1 | 8/2015 | Baldwin et al. |
| 2018/0032997 A1 | 2/2018 | Gordon et al. |

FOREIGN PATENT DOCUMENTS

| | | |
|---|---|---|
| CN | 101042866 A | 9/2007 |
| CN | 101064753 A | 10/2007 |
| CN | 101535983 A | 9/2009 |
| CN | 101689366 A | 3/2010 |
| CN | 102298928 A | 12/2011 |
| CN | 102324241 A | 1/2012 |
| CN | 102750125 A | 10/2012 |
| CN | 102792320 A | 11/2012 |
| EP | 1 033 701 A2 | 9/2000 |
| JP | 8-331237 A | 12/1996 |
| JP | 2000-250575 A | 9/2000 |
| JP | 2000-339250 A | 12/2000 |
| JP | 2004-258233 A | 9/2004 |
| JP | 2005-065156 A | 3/2005 |
| KR | 10-2001-0004832 A | 1/2001 |
| KR | 10-2005-0122604 A | 12/2005 |
| KR | 10-2009-0000442 A | 1/2009 |
| KR | 10-2012-0080069 A | 7/2012 |
| WO | 2011/088053 A2 | 7/2011 |

OTHER PUBLICATIONS

Communication dated Dec. 8, 2021, issued by the State Intellectual Property Office of P.R. China in counterpart Chinese Application No. 201710749861.3.
Communication dated Mar. 3, 2021, issued by the State Intellectual Property Office of P.R. China in counterpart Chinese Application No. 201710749861.3.
Communication dated Nov. 30, 2022 issued by National Intellectual Property Administration, PRC, in counterpart Chinese Patent Application No. 202210035613.3.
Communication dated Sep. 1, 2022 issued by the Chinese Patent Office in Chinese Patent Application No. 201410006748.2.
Communication dated Sep. 26, 2019 issued by the State Intellectual Property Office of P.R. China in counterpart Chinese Application No. 201410006748.2.
Communication from the Korean Intellectual Property Office dated Aug. 18, 2015 in a counterpart Korean application No. 10-2013-0001829.
Communication issued Jun. 3, 2020 by the State Intellectual Proeprty Office of P.R. China in counterpart Chinese Patent Application No. 201710749861.3.

(56) References Cited

OTHER PUBLICATIONS

Communication issued May 6, 2022 by the Chinese Patent Office for Chinese Patent Application No. 201410006748.2.
Communication issued Nov. 6, 2017 by the State Intellectual Property Office of P.R. China in counterpart Chinese Patent Application No. 201410006748.2.

* cited by examiner ative server, the method including: receiving a first uttered voice signal from an apparatus; storing utterance history information of a second uttered voice signal received from the apparatus before the first uttered voice signal is received; extracting uttered elements from the received first uttered voice signal; generating response information based on at least one from among the stored utterance history information and the extracted uttered elements; and transmitting the response information to the apparatus.

ELECTRONIC DEVICE PROVIDING VARYING RESPONSE BASED ON CONTENTS INCLUDED IN INPUT, AND METHOD AND COMPUTER READABLE MEDIUM THEREOF

CROSS-REFERENCE TO RELATED APPLICATION

This application is a continuation application of U.S. application Ser. No. 17/112,170, filed Dec. 4, 2020, now U.S. Pat. No. 11,854,570, which is a continuation of U.S. application Ser. No. 14/149,296, filed Jan. 7, 2014, now U.S. Pat. No. 10,891,968, which claims priority from Korean Patent Application No. 10-2013-0001829, filed on Jan. 7, 2013, in the Korean Intellectual Property Office, the disclosures of each of which being incorporated by reference herein in their entireties.

BACKGROUND

1. Field

Apparatuses, methods, and systems consistent with exemplary embodiments generally relate to providing an interactive server, a control method thereof, and an interactive system, and more particularly, to providing an interactive server which provides response information corresponding to various utterances of a user, a control method thereof, and an interactive system.

2. Description of the Related Art

In general, a display apparatus which is capable of recognizing voices in an interactive system collects uttered voices of a user and transmits the collected uttered voices to an external server connected through a network. When the external server receives the uttered voices, the external server parses the uttered voices to comprehend intensions of the user, generates response information corresponding to the uttered voices, and transmits the response information to the display apparatus. Therefore, the display apparatus executes a function corresponding to the uttered voices of the user or provides information corresponding to the uttered voices of the user based on the response information received from the external server.

However, the conventional interactive system has a limit to parsing of the uttered voices of the user and comprehending of the intention of the user based on the parsed result. For example, in the case of a clear uttered voice of the user like "Show first content.", the external server parses the uttered voice to correctly comprehend an intention of the user, generates response information corresponding to the uttered voice, and transmits the response information to the display apparatus. Therefore, the display apparatus displays the first content requested by the user based on the response information.

However, in the case of an ambiguous uttered voice of the user like "Show this.", the external server does not clearly comprehend an intention of the user from the ambiguous uttered voice. In other words, the interactive system comprehends an intention of the user only with respect to a predefined uttered voice and performs an operation corresponding to the predefined uttered voice or provides information corresponding to the predefined uttered voice, thereby restricting utterances of the user.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

The exemplary embodiments provide an interactive server which performs operations corresponding to various utterances of a user in an interactive system, a control method thereof, and the interactive system.

According to an aspect of the exemplary embodiments, there is provided an interactive server including: a communicator configured to communicate with a apparatus to receive a first uttered voice signal; a storage device configured to store utterance history information of a second uttered voice signal received from the apparatus before the first uttered voice signal is received; an extractor configured to extract uttered elements from the received first uttered voice signal; and a controller configured to generate response information based on at least one from among the utterance history information stored in the storage device and the extracted uttered elements, and transmit the response information to the apparatus.

If an execution language and a command respectively corresponding to the extracted uttered elements are stored in the storage device, the controller may combine the execution language and the command respectively corresponding to the uttered elements to generate the response information. If an execution language and a command respectively corresponding to the extracted uttered elements are not stored in the storage device, the controller may estimate an execution language and a command respectively corresponding to the extracted uttered elements based on the utterance history information stored in the storage device and combine the estimated execution language and command to generate the response information.

The first uttered voice signal may comprise a first uttered element and a second uttered element. If the execution language and the command respectively corresponding to the extracted uttered elements are not stored in the storage device, the controller may acquire utterance history information stored within a preset time range based on a time when the second uttered voice signal is received and estimate an execution language corresponding to the first uttered element and a command corresponding to the second uttered element as the execution language and the command corresponding to the first uttered voice signal within the acquired utterance history information.

If the utterance history information stored in the storage device does not include the utterance history information stored within the preset time based on the time when the second uttered voice signal is received, the controller may not generate the response information.

If the first uttered voice signal does not include at least one of the first uttered element and the second uttered element, the controller may generate response information corresponding to the second uttered voice signal based on the utterance history information stored within the preset time range based on the time when the second uttered voice signal is received.

The interactive server may further include a voice processor configured to convert the received first uttered voice signal into text information.

According to another aspect of the exemplary embodiments, there is provided a method of controlling an interactive server. The method may comprise: receiving a first uttered voice signal from an apparatus; extracting uttered elements from the received first uttered voice signal; generating response information based on stored utterance history information and the extracted uttered elements; and transmitting the generated response information to the apparatus. The stored utterance history information may be information which is generated based on a second uttered voice signal received from the apparatus before the first uttered voice signal is received.

The method may further include: determining whether an execution language and a command respectively corresponding to the extracted uttered elements exist. If the execution language and the command respectively corresponding to the uttered elements exist, the execution language and the command respectively corresponding to the uttered elements may be combined to generate response information, and if the execution language and the command respectively corresponding to the uttered elements do not exist, an execution language and a command corresponding to the extracted uttered elements may be estimated based on the stored utterance history information and may be combined to generate the response information.

The first uttered voice signal may comprise first and second uttered elements. If the execution language and the command respectively corresponding to the uttered elements do not exist, utterance history information stored within a preset time range may be acquired based on a time when the second uttered voice signal is received, and the execution language corresponding to a first uttered element and the command corresponding to the second uttered element may be estimated as the execution language and a command corresponding to the uttered voice signal within the acquired utterance history information.

If the utterance history information does not comprise the utterance history information stored within the preset time range based on the time when the second uttered voice signal is received, the response information may not be generated.

If the first uttered voice signal may not comprise at least one of the first and second uttered elements, response information corresponding to the first uttered voice signal may be generated based on the utterance history information stored within the preset time range based on the time when the second uttered voice signal is received.

The method may further comprise: converting the received first uttered voice signal into text information.

According to another aspect of the exemplary embodiments, there is provided an interactive system comprising: an apparatus which, if a first uttered voice of a user is input, performs a function corresponding to the input uttered voice; and an interactive server which, if a first voice signal is received from the apparatus, extracts uttered elements from the first uttered voice signal, generates response information based on at least one from among stored utterance history information and the extracted uttered elements, and transmits the response information to the apparatus. The apparatus may perform a function corresponding to an intention of the user based on the response information received from the interactive server.

The interactive server may generate the response information based on an execution language and a command respectively corresponding to the uttered elements if the execution language and the command respectively corresponding to the extracted uttered elements exist, and, if the execution language and the command respectively corresponding to the extracted uttered elements do not exist, estimate an execution language and a command respectively corresponding to the extracted uttered elements based on the stored utterance history information and combine the estimated execution language and command to generate the response information.

According to an aspect of an exemplary embodiment, the time referred to above may be related to a time difference between utterances of the first uttered voice signal and the second uttered voice signal. According to an aspect of another exemplary embodiment, the apparatus referred to above may be a display apparatus.

According to yet another aspect of an exemplary embodiment, the first uttered voice signal may be uttered by a first user and the utterance history information may relate to an uttered voice input of a second user.

According to various exemplary embodiments of the present general inventive concept, in an interactive system, an interactive server may comprehend intentions of a user with respect to various uttered voices of the user, generate response information of the various uttered voices, and transmit the response information to a display apparatus.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Figure 1:
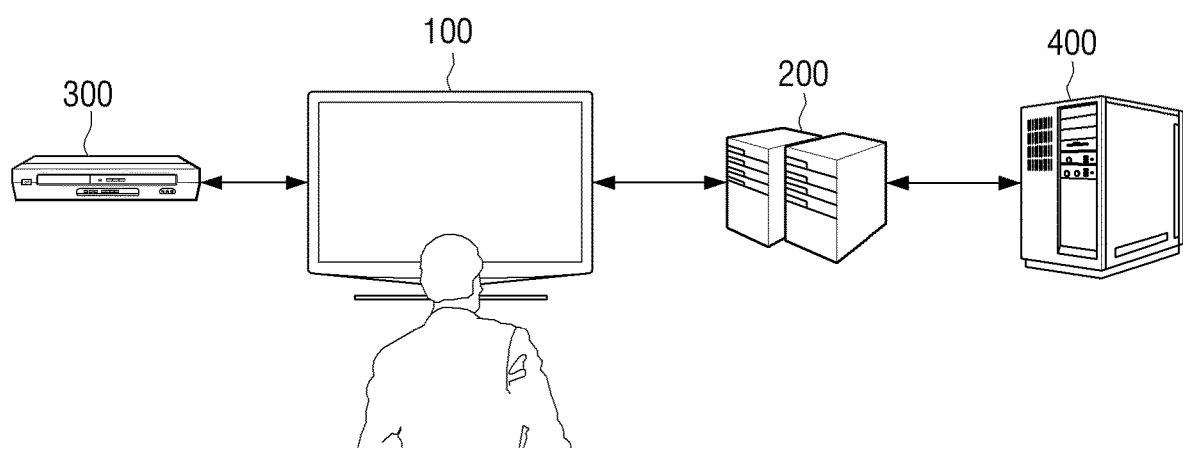
FIG. 1 is a view illustrating an interactive system which provides response information appropriate for a uttered voice of a user according to an exemplary embodiment of the present general inventive concept.

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

FIG. 1 is a view illustrating an interactive system which provides response information appropriate for an uttered voice of a user according to an exemplary embodiment of the present general inventive concept.

Referring to FIG. 1, the interactive system according to the present exemplary embodiment includes a display apparatus 100 and an interactive server 200.

The display apparatus 100 may be realized as various types of electronic apparatuses which surf the Internet, such as a smart TV, a portable phone such as a smart phone, a desktop PC, a notebook PC, a navigation system, etc. If an uttered voice of a user is input, the display apparatus 100 performs an operation corresponding to the uttered voice of the user. In detail, the display apparatus 100 outputs a response message corresponding to the uttered voice of the user or performs a function corresponding to the uttered voice of the user. In other words, the display apparatus 100 parses the input uttered voice to determine whether the input uttered voice is internally performable and performs the function corresponding to the input uttered voice according to the determination result or performs an operation based on response information received from the interactive server 200.

For example, if an uttered voice "Turn up volume." is input, the display apparatus 100 adjusts a volume based on one of pre-stored control information pieces corresponding to the input uttered voice.

As another example, if an uttered voice "How's the weather today?" is input, the display apparatus 100 transmits an uttered voice signal of the input uttered voice to the interactive server 200. Here, the uttered voice may be an analog signal. Therefore, the display apparatus 100 converts the uttered voice that is the analog signal into a digital signal (hereinafter referred to as an uttered voice) and transmits the digital signal to the interactive server 200. The display apparatus 100 outputs a result of the today's weather as a voice or a text format image based on the response information received from the interactive server 200.

As another example, if an uttered voice "Show ○○○ (content name)." is input, the display apparatus 100 transmits the input uttered voice to the interactive server 200. If response information is received from the interactive server 200, the display apparatus 100 displays a search list of "○○○(content name)" based on the received response information. Here, the search list may include content information of each of episodes. Therefore, the user checks the content information of the episodes displayed on the search list to make an utterance for selecting ○○○ (content name) of an episode that the user wants to view. For example, the user makes an utterance "Show first one." to view "○○○ (content name)" corresponding to the first one of the content information displayed on the search list. Therefore, the display apparatus 100 receives the uttered voice "Show first one." and transmits the uttered voice "Show first one." to the interactive server 200. If response information corresponding to the uttered voice is received from the interactive server 200, the display apparatus 100 receives "○○○ (content name)" corresponding to the first content information from a content providing server 300 and displays "○○○ (content name)" based on the received response information.

The interactive server 200 provides response information appropriate for an intention of the user based on an uttered voice of the user received from the display apparatus 100. In detail, if an uttered voice of the user is received from the display apparatus 100, the interactive server 200 extracts uttered elements from the received uttered voice, and generates and transmits response information related to the uttered voice of the user based on the extracted uttered elements. As described above, the uttered voice of the user received from the display apparatus 100 may be a digital signal. Therefore, if the uttered voice converted into the digital signal is received, the interactive server 200 generates the uttered voice as text information, parses the text information to extract uttered elements, and generates response information corresponding to the uttered voice of the user based on the extracted uttered elements. The generation of the text information from the uttered voice converted into the digital signal is a well-known technology, and thus a detailed description thereof will be omitted herein.

The uttered elements are core keywords of the uttered voice of the user for performing an operation requested by the user and are classified into uttered elements extracted according to a domain, a user action, and a feature. As described above, if text information is generated with respect to the uttered voice of the user "How's the weather today?", the interactive server 200 extracts uttered elements "today," "weather," and "How." The interactive server 200 classifies the uttered elements "today" and "weather" as uttered elements (hereinafter referred to as first uttered elements) of a feature (hereinafter referred to as an object to be executed) and classifies the uttered element "How?" as an uttered element (hereinafter referred to as a second uttered element) of a user action (hereinafter referred to as an execution command). The interactive server 200 classifies an uttered element (hereinafter referred to as a third uttered element) of a domain as belonging to a web search domain based on the extracted uttered elements. When the first through third uttered elements are classified from the text information of the uttered voice of the user, the interactive server 200 is provided with weather information from an external server 400, which provides various types of contents, and generates response information including the weather information, and transmits the response information to the display apparatus 100. Therefore, the display apparatus 100 displays information about a today's weather through at least one of a voice and a text based on the response information received from the interactive server 200.

If text information of an uttered voice "Select first one." is generated, the interactive server 200 extracts a first uttered element "first one" and a second uttered element "Select" from the generated text information. If the first and second uttered elements are extracted, the interactive server 200 determines whether to generate response information appropriate for an intention of the user based on the extracted first and second uttered elements. According to an exemplary embodiment, the interactive server 200 may determine whether to generate response information appropriate for an intention of the user according to whether information corresponding to the extracted first and second uttered elements exists in a database (DB). Here, the information corresponding to the first and second uttered elements may be respectively an execution language corresponding to the first uttered element and a command corresponding to the second uttered element. Therefore, the interactive server 200 determines whether the execution language and the command respectively corresponding to the first and second uttered elements exist in the DB. If it is determined that the information corresponding to the first and second uttered elements does not exist in the DB, the interactive server 200 generates response information based on one of stored uttered history information just before the uttered voice "Select first one." is received and the extracted first and second uttered elements and transmits the response information to the display apparatus 100. For example, an uttered voice "Search for ○○○ (content name)." may be received just before the uttered voice "Select first one." is received, and utterance history information about the uttered voice "○○○ (content name)" may be stored. Therefore, the interactive server 200 generates response information related to a content execution of "○○○ (content name)" based on previous utterance history information and transmits the response information to the display apparatus 100. Therefore, the display apparatus 100 displays a first content of "○○○ (content name)" based on the response information received from the interactive server 200.

The interactive server 200 may include a first server 10 which generates an uttered voice of the user converted into a digital signal as text information and a second server 20 which generates response information corresponding to the uttered voice generated as the text information. An interactive system which provides response information appropriate for an uttered voice of a user through the display apparatus 100 and the first and second servers 10 and 20 will now be described in detail.

Figure 2:
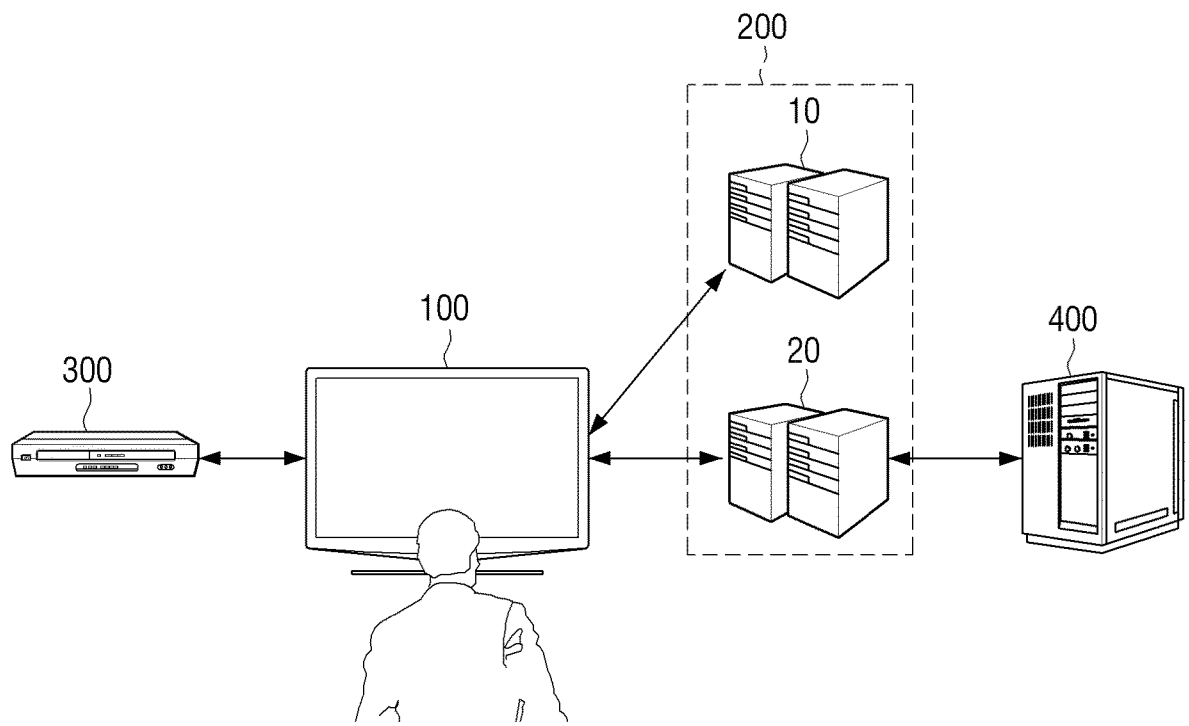
FIG. 2 is a view illustrating an interactive system which provides response information appropriate for a uttered voice of a user according to another exemplary embodiment of the present general inventive concept.

FIG. 2 is a view illustrating an interactive system which provides response information appropriate for an uttered voice of a user, according to another exemplary embodiment of the present general inventive concept.

As shown in FIG. 2, if an uttered voice is input from a user, a display apparatus 100 converts the input uttered voice into a digital signal and transmits the digital signal to the first server 10. If the uttered voice converted into the digital signal is received, the first server 10 generates text information of the uttered voice of the user according to a particular pattern of stored various uttered voices and transmits the text information to the display apparatus 100.

The display apparatus 100 receives the text information of the uttered voice of the user from the first server 100 and transmits the text information of the uttered voice of the user to the second server 20. The second server 20 receives the text information of the uttered voice of the user, parses the received text information to extract uttered elements, generates response information for performing an operation corresponding to the uttered voice of the user based on the extracted uttered elements, and transmits the response information to the display apparatus 100.

An operation of providing response information corresponding to an uttered voice of a user in an interactive system including the display apparatus 100 and the interactive server 200 has been schematically described in brief. Elements of the display apparatus 100 and elements of the interactive server 200 will now be described in detail.

Figure 3:
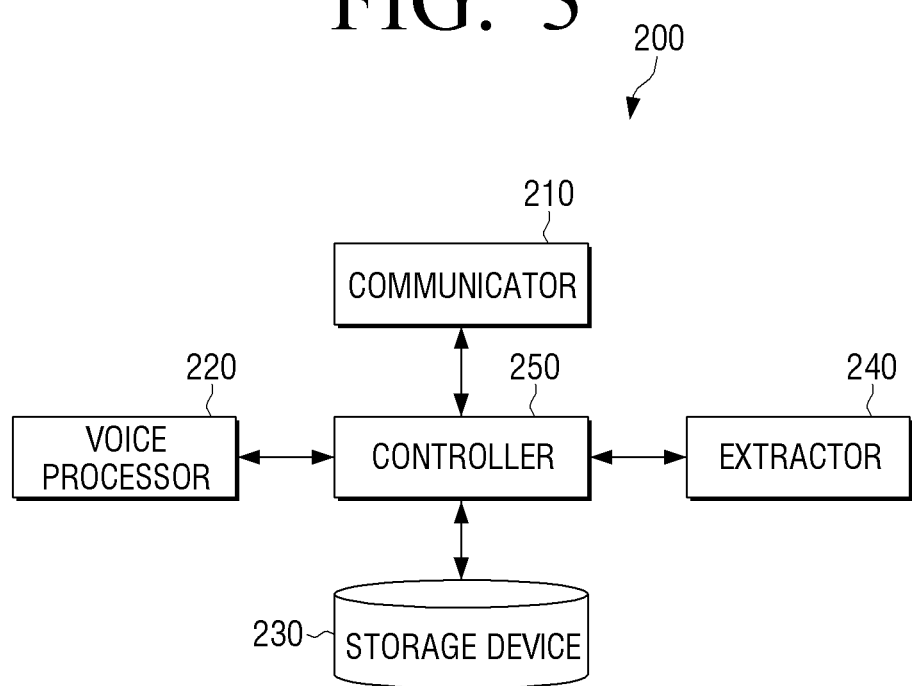
FIG. 3 is a block diagram illustrating an interactive server according to an exemplary embodiment of the present general inventive concept.

FIG. 3 is a block diagram illustrating an interactive server 200 according to an exemplary embodiment of the present general inventive concept.

Referring to FIG. 3, the interactive server 200 includes a communicator 210, a voice processor 220, a storage device 230, an extractor 240, and a controller 250.

The communicator 210 communicates with the display apparatus 100 which provides an uttered voice of a user. In particular, the communicator 210 receives a digital signal (hereinafter referred to as an uttered voice) of an uttered voice including a first uttered element indicating an object to be executed and a second uttered element indicating an execution command. Here, the first uttered element indicating the object to be executed is an uttered element classified as a feature in the uttered voice of the user. Also, the second uttered element indicating the execution command is an uttered element classified as a user action in the uttered voice of the user. For example, in an uttered voice "Search for action movie.", "action" may be a first uttered element classified as a feature, and "Search" may be a second uttered element classified as a user action.

If the uttered voice including the first and second uttered elements is received as described above, the voice processor 220 converts the received uttered voice into text information. According to an exemplary embodiment, the voice processor 220 may convert the received uttered voice of the user into a text by using a Speech-to-Text (STT) algorithm. However, the present general inventive concept is not limited thereto, and thus the communicator 210 may receive the text information of the uttered voice of the user from the display apparatus 100. In this case, the display apparatus 100 receives the text information of the uttered voice of the user from a voice recognizing apparatus (not shown) such as the first server 10 and transmits the text information of the uttered voice of the user to the interactive server 200. Therefore, the communicator 210 receives the text information of the uttered voice of the user from the display apparatus 100. If the text information of the uttered voice of the user is received from the display apparatus 100, a configuration of the voice processor 220 may be omitted.

If the uttered voice of the user is converted into the text information or the text information of the uttered voice of the user is received from the display apparatus 100, the extractor 240 extracts uttered elements from the uttered voice converted into the text information. As described above, the extractor 240 may extract a first uttered element indicating a feature and a second uttered element indicating an execution command from the uttered voice converted into the text information.

As in the above-described example, the extractor 240 may extract first uttered elements "action" and "movie" and a second uttered element "Search" from an uttered voice "Search for action movie." As another example, the extractor 240 may extract a first uttered element "this" and a second uttered element "Execute" from an uttered voice "Execute this."

If the uttered elements as described above are extracted, the controller 250 generates response information based on utterance history information stored in the storage device 230 and the extracted uttered elements and transmits the generated response information to the display apparatus 100. Here, the storage device 230 is a storage medium which stores various types of programs necessary for operating the interactive server 200 and may be realized as a memory, a hard disk drive (HDD), or the like. For example, the storage device 230 may include a read only memory (ROM) which stores a program for performing an operation of the controller 250, a random access memory (RAM) which temporarily stores data generated according to the performance of the operation of the controller 250, etc. The storage device 230 may further include an electrically erasable and programmable ROM (EEROM) which stores various types of reference data. In particular, the storage device 230 stores the utterance history information of the uttered voice received from the display apparatus 100. Here, the utterance history information refers to information which is generated based on an uttered voice received before a current uttered voice is received from the display apparatus 100. In detail, the storage device 230 stores the utterance history information which includes at least one of the text information generated from the uttered voice received from the display apparatus 100, time information about when the corresponding uttered voice is received, response information generated based on the corresponding uttered voice, and time information about when the response information is generated.

Therefore, the controller 250 generates response information based on at least one of previous utterance history information stored in the storage device 230 before a current uttered voice is received and the uttered elements extracted from the received uttered voice and transmits the response information to the display apparatus 100. In detail, the controller 250 determines whether information corresponding to the uttered elements extracted by the extractor 240 exists in the storage device 230. If it is determined that the information corresponding to the extracted uttered elements exists in the storage device 230, the controller 250 generates response information based on the information corresponding to the extracted uttered elements. Here, the information corresponding to the extracted uttered elements may include at least one of an execution language corresponding to a first uttered element indicating an object to be executed and a command corresponding to a second uttered element indicating an execution command. The execution language and the command may be stored in the storage device 230. In other words, the storage device 230 may further include execution languages defined according to first uttered elements and commands defined according to second uttered elements. For example, a first uttered element indirectly indicating an object "this" to be executed may be defined as an execution language "$this$". A first uttered element indirectly indicating an object "next" to be executed may be defined as an execution language "$this$". A first uttered element indirectly indicating an object "third" to be executed may be defined as an execution language "$3rd$". A first uttered element directly indicating an object to be executed like "○○○ (content name)" may be defined as an execution language "$○○○(content name)$". A second uttered element indicating an execution command may be classified into a content search, a content recommendation, a device function execution, a device user interface (UI) control, and a web search based on a first uttered element directly indicating an object to be executed and an execution area which is to provide response information corresponding to an uttered voice. A command may be defined according to the classified types. Therefore, if uttered elements are extracted from an uttered voice of the user, the controller 250 determines whether an execution language and a command corresponding to the extracted uttered elements have been stored in the storage device 230. If it is determined that the execution language and the command corresponding to the extracted uttered elements have been stored in the storage device 230, the controller 250 acquires the execution language and the command corresponding to the extracted uttered elements and combines the acquired execution language and command to generate response information.

For example, the extractor 240 may extract a first uttered element "○○○ (content name)" and a second uttered element "Search" from an uttered voice "Search for ○○○(content name)." If the first and second uttered elements are extracted from the uttered voice "Search for ○○○(content name)", the controller 250 determines that an execution area is a content based on the extracted first uttered element. The controller 250 also acquires an execution language "$○○○(content name)$" corresponding to the first uttered element "○○○ (content name)" with reference to execution languages defined according to first uttered elements stored in the storage device 230. The controller 250 determines that a type of the second uttered element "Search" is related to a content search based on the execution area determined as the content. Therefore, the controller 250 acquires a command "content_search" corresponding to the content search from commands defined according to second uttered elements stored in the storage device 230. The controller 250 combines the execution language "$○○○(content name)$" and the command "content search" respectively corresponding to the first and second uttered elements to generate an execution command script "content_search($○○○(content name)$)" If the execution command script is generated, the controller 250 transmits response information including the generated execution command script to the display apparatus 100. Therefore, the display apparatus 100 receives content information of episodes of "○○○(content name)" from the content providing server 300 based on the execution command script included in the response information received from the interactive server 200 and displays a content list of the received content information of the episodes on a screen.

However, the present general inventive concept is not limited thereto, and thus the controller 250 may acquire content information of episodes of "○○○(content name)" from electronic program guide (EPG) information stored in the storage device 230 based on the execution command script "content_search($○○○(content name)$)" or may receive the content information from the external server 400 and transmit the content information to the display apparatus 100.

As another example, the extractor 240 may extract a first uttered element "bedtime reservation" and a second uttered element "Make" from an uttered voice "Make bedtime reservation." If the first and second uttered elements are extracted from the uttered voice "Make bedtime reservation.", the controller 250 determines that an execution area is a device control based on the extracted first uttered element. The controller 250 also acquires an execution language "$bedtime reservation$" corresponding to the first uttered element "bedtime reservation" with reference to execution languages defined according to first uttered elements stored in the storage device 230. The controller 250 determines that a type of the second uttered element "Make" corresponds to a device function execution based on the execution area determined as the device control. Therefore, the controller 250 acquires a command "device_execute" corresponding to the device function execution from commands defined according to second uttered elements stored in the storage device 230. The controller 250 combines the execution language "$bedtime reservation$" and the command "device_execute" respectively corresponding to the first and second uttered elements to generate an execution command script "device_execute($bedtime reservation$)". If the execution command script is generated, the controller 250 transmits response information including the generated execution command script to the display apparatus 100. Therefore, the display apparatus 100 sets a bedtime reservation based on the execution command script of the response information received from the interactive server 200 and outputs a notification message showing that the bedtime reservation has been set through at least one of a voice and a text.

As another example, if uttered information including an uttered voice "Select first one." and execution information is received, the extractor 240 extracts a first uttered element "first one" and a second uttered element "Select" from the uttered voice "Select first one." If the first and second uttered elements are extracted from the uttered voice "Select first one.", the controller 250 acquires an execution language "$1st$" corresponding to the first uttered element "first one"

with reference to execution languages defined according to first uttered elements stored in the storage device 230. The controller 250 determines that an execution area is a device UI control based on the execution information of the received uttered information and determines that a type of the second uttered element "Select" corresponds to the device UI control based on the determined execution area. Therefore, the controller 250 acquires a command "device_select" corresponding to the device UI control from commands defined according to second uttered elements stored in the storage device 230. If the execution language "$1st$" corresponding to the first uttered element "first one" is acquired, the controller 250 converts the execution language into an execution language corresponding to an acquired execution language "$1st$" based on the execution information of the uttered information received from the display apparatus 100. The controller 250 combines the execution language converted from the acquired execution language "$1st$" and the command to generate an execution command script.

An operation of transmitting an uttered voice and uttered information including execution information from the display apparatus 100 to the interactive server 200 and an operation of generating response information based the uttered information received from the display apparatus 100 in the interactive server 200 as in the above-described examples will now be described.

Figure 4:
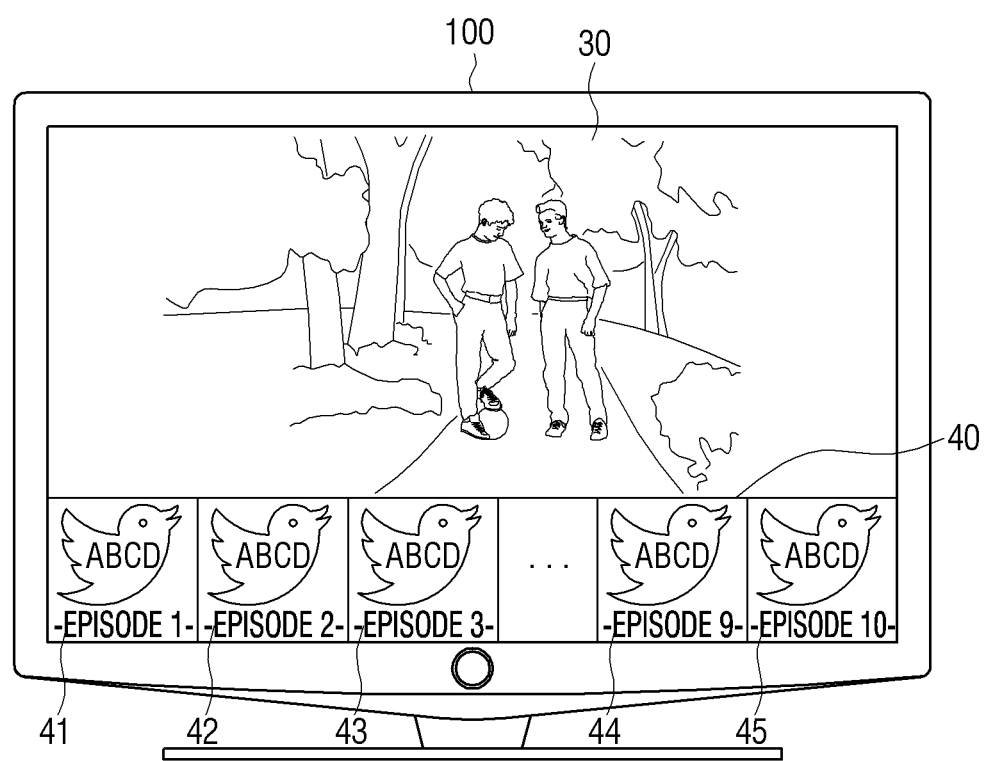
FIG. 4 is a view illustrating a method of generating uttered information based on a display state of an object displayed on a screen of a display apparatus according to an exemplary embodiment of the present general inventive concept.

FIG. 4 is a view illustrating a method of generating uttered information based on a display state of an object displayed on a screen of a display apparatus according to an exemplary embodiment of the present general inventive concept.

As shown in FIG. 4, the display apparatus 100 receives and displays a first content 30 through a channel requested by a user. The display apparatus 100 also displays a content list 40 of a second content requested by the user based on a user command on a screen. Content information 41 through 45 of episodes of the second content which have been broadcasted until now are displayed on the content list 40. The display apparatus 100 allocates identification information to the content information 41 through 45 displayed on the content list 40 based on preset priorities. When the first content 30 and the content list 40 of the second content are displayed on the screen as described above, the user makes an utterance to view the second content corresponding to a particular episode with reference to the content information 41 through 45 displayed on the content list 40. For example, the user makes an utterance "Select third one." to view the second content corresponding to the content information 43 of a third episode. If such an uttered voice is input, the display apparatus 100 determines whether a currently input uttered voice has been input within a preset time, based on an input time of a previous uttered voice. If it is determined the currently input uttered voice has been input within the preset time, the display apparatus 100 transmits an uttered voice "Select third one." to the interactive server 200. If it is determined that the currently input uttered voice has not been input within the preset time, the display apparatus 100 transmits the uttered voice "Select third one." and uttered information including the identification information (the above-described execution information) respectively allocated to the content information 41 through 45 of the episodes displayed on the content list 40 to the interactive server 200.

If the uttered information as described above is received, the extractor 240 extracts a first uttered element "third one" and a second uttered element "Select" from the uttered voice of the received uttered information. If the first and second uttered elements are extracted, the controller 250 determines whether an execution language and a command respectively corresponding to the extracted first and second uttered elements have been stored in the storage device 230. As described above, the storage device 230 may store execution languages and commands defined according to first and second uttered elements. Therefore, the controller 250 acquires an execution language "$3rd$." corresponding to the first uttered element "third one" with reference to the execution languages defined according to the first uttered elements stored in the storage device 230. The controller 250 determines that the execution area is a device UI control based on the identification information of the received uttered information and determines that a type of the second uttered element "Select" is a device UI control based on the determined execution area. Therefore, the controller 250 acquires a command "device_select" corresponding to the device UI control from commands defined according to second uttered elements stored in the storage device 230. If an execution language "$3rd$." corresponding to the first uttered element "third one" is acquired, the controller 250 converts the execution language into an execution language corresponding to an acquired execution language "$3rd$." based on the identification information included in the uttered information received from the display apparatus 100. For example, if identification information of the content information 43 corresponding to the execution language "$3rd$." is "#3", the controller 250 may convert the execution language "$3rd$" into an execution language "#3" converted from an acquired execution language "$3rd$". The controller 250 combines the execution language "#3" and the command "device_select" to generate an execution command script "device_select(#3)" and transmits response information including the execution command script "device_select(#3)" to the display apparatus 100. Therefore, the display apparatus 100 receives and displays the second content of an episode corresponding to the content information 43 from the content providing server 300 based on the execution command script included in the response information received from the interactive server 200.

If an execution language and a command corresponding to uttered elements extracted from an uttered voice of a user exist as described above, the controller 250 generates response information corresponding to an intention of the user based on the execution language and the command corresponding to the uttered elements.

If the execution language and the command corresponding to the uttered elements extracted from the uttered voice of the user do not exist, the controller 250 estimates an execution language and a command corresponding to the extracted uttered elements based on utterance history information stored in the storage device 230. The controller 250 combines the estimated execution language and command to generate response information appropriate for an intention of the user.

According to an exemplary embodiment, if the execution language and the command corresponding to the extracted uttered elements, i.e., first and second uttered elements, exist, the controller 250 acquires utterance history information stored within a preset time range based on a time when a current uttered voice is received, from utterance history information stored in the storage device 230. The controller 250 estimates an execution language corresponding to the first uttered element and a command corresponding to the second uttered element as an execution language and a command corresponding to the received uttered voice within the acquired utterance history information. If the utterance history information stored within the preset time range is not stored based on the time when the current uttered voice is received, among the utterance history information stored in the storage device 230, the controller 250 does not generate response information.

As described above, the storage device 230 may store utterance history information including at least one of text information generated from an uttered voice received from the display apparatus 100, time information about when the corresponding uttered voice is received, response information generated based on the corresponding uttered voice, and time information about when the response information is generated. Therefore, if at least one of an execution language and a command corresponding to first and second uttered elements extracted from a currently received uttered voice is not stored in the storage device 230, the controller 250 estimates an execution language and a command corresponding to the first and second uttered elements based on the utterance history information stored in the storage device 230.

For example, the extractor 240 may extract a first uttered element "first one" and a second uttered element "Select" from an uttered voice "Select first one." If the first and second uttered elements are extracted as described above, the controller 250 determines whether an execution language and a command respectively corresponding to the first and second uttered elements have been stored in the storage device 230. In detail, the controller 250 acquires an execution language "$1st$" corresponding to the uttered element "first one" with reference to execution languages defined according to first uttered elements stored in the storage device 230. The controller 250 determines whether it is possible to determine an execution area based on the first uttered element. If it is determined that it is impossible to determine the execution area from the first uttered element "first one", the controller 250 does not acquire a command corresponding to the second uttered element "Select" from the storage device 230 which stores commands defined according to second uttered elements. Therefore, the controller 250 determines that an execution area and an execution command for providing a service of the uttered voice is unclear from the uttered voice "Select first one." According to the determination result, the controller 250 determines whether utterance history information has been stored within a preset time range among utterance history information stored in the storage device 230 based on a time when the uttered voice "Select first one." is received. In other words, the controller 250 determines whether a time difference between the received time of the uttered voice "Select first one." and the latest previous utterance history information belongs to a preset time range among utterance history information stored in the storage device 230. If it is determined that the latest previous utterance history information does not belong to the preset time range, the controller 250 does not generate response information with respect to the uttered voice "Select first one." If it is determined that the latest previous utterance history information belongs to the preset time range, the extractor 240 extracts first and second uttered elements from text information of the uttered voice included in the latest previous utterance history information.

For example, if the uttered voice included in the previous utterance history information is "Search for "ooo (content name)"", the extractor 240 extracts a first uttered element "ooo (content name)" and a second uttered element "Search". The controller 250 estimates the first uttered element "first one" as the first uttered element "ooo (content name)" based on the first uttered element "ooo (content name)" extracted from the uttered voice of the previous utterance history information. The controller 250 determines that an execution area is a device UI control based on the estimated first uttered element and acquires a command "device_select" corresponding to the device UI control from commands defined according to second uttered elements stored in the storage device 230. The controller 250 combines the execution language "$1st$" corresponding to the acquired first uttered element and the command "device_select" corresponding to the second uttered element to generate an execution command script "device_select($1st$)". The controller 250 transmits response information including the generated execution command script to the display apparatus 100. Therefore, the display apparatus 100 outputs a response message "You have selected first content." through at least one of a voice and a text based on the response information received from the interactive server 200. The display apparatus 100 also receives a first content from the content providing server 300 based on the execution command script of the response information and displays the first content.

According to another exemplary embodiment, if a received uttered voice does not include at least one of first and second uttered elements, the controller 250 may generate response information based on utterance history information stored within a preset tine range among utterance history information stored in the storage device 230 based on a time when the uttered voice is received.

For example, the extractor 240 does not extract first and second uttered elements from an uttered voice "Yes." In this case, the controller 250 determines that the uttered voice "Yes." is unclear and acquires previous utterance history information stored within a preset time range from utterance history information stored in the storage device 230 based on a time when the uttered voice "Yes." is received. For example, if an uttered voice included in the acquired previous utterance history information is "Turn off TV.", the controller 250 extracts a first uttered element "TV" and a second uttered element "Turn off". The controller 250 estimates the currently received uttered voice "Yes." as "confirm" based on the extracted first and second uttered elements. Therefore, the controller 250 determines that an execution area is a device control based on the first uttered element "TV" extracted from the previous utterance history information. The controller 250 acquires execution language "$TV$" corresponding to the first uttered element "TV" with reference to execution languages defined according to first uttered elements stored in the storage device 230. The controller 250 determines that a type of the second uttered element "Turn off" is a device function execution based on the execution area determined as the device control. Therefore, the controller 150 acquires a command corresponding to the device function execution from commands defined according to second uttered elements stored in the storage device 230. The controller 250 acquires a command "device_execute_turn off" corresponding to a power control from commands acquired to correspond to the device function execution. The controller 250 combines the execution language "$TV$" corresponding to the first uttered element and the command "device_execute_turn off" corresponding to the second uttered element to generate an execution command script "device_exectue_turn off($TV$)". If the execution command script is generated, the controller 250 transmits response information including the generated execution command script to the display apparatus 100. Therefore, the display apparatus 100 turns off a TV based on the execution command script included in the response information received from the interactive server 200.

The elements of the interactive server 200 according to the present general inventive concept have been described in detail. Elements of the display apparatus 100 which receive an uttered voice of a user will now be described in detail.

Figure 5:
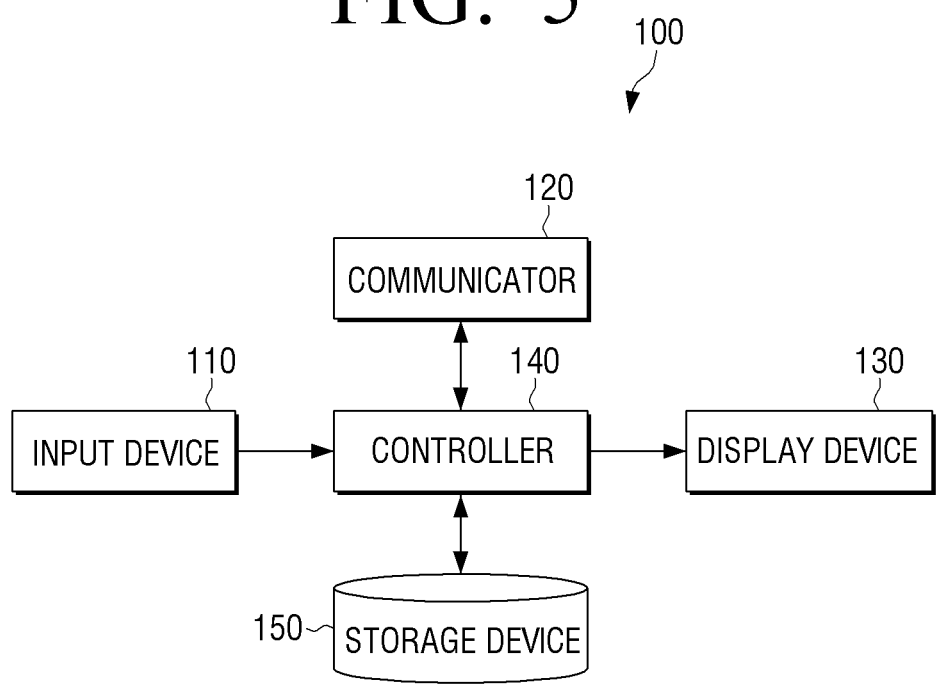
FIG. 5 is a block diagram illustrating a display apparatus according to an exemplary embodiment of the present general inventive concept.

FIG. 5 is a block diagram illustrating a display apparatus 100 according to an exemplary embodiment of the present general inventive concept.

Referring to FIG. 5, the display apparatus 100 includes an input device 110, a communicator 120, a display device 130, a controller 140, and a storage device 150.

The input device 110 receives an uttered voice from a user. In detail, if an analog uttered voice of the user is input, the input device 110 samples the input analog uttered voice of the user to convert the analog uttered voice into a digital signal. Here, if the input uttered voice of the user includes noise (e.g., an air conditioner sound, a cleaner sound, or the like), the input device 110 removes the noise from the uttered voice of the user and then converts the uttered voice of the user from which the noise has been removed, into a digital signal. The input device 110 also receives various types of user controls and transmits the various types of user controls to the controller 130. In this case, the input device 110 receives a user control command through a touch pad, a keypad including various types of functional keys, numeral keys, special keys, letter keys, etc., or a touch screen.

The communicator 120 transmits the uttered voice of the user input through the input device 110 to a server apparatus (hereinafter referred to as an interactive server) and receives response information corresponding to the transmitted uttered voice. Here, the communicator 120 may include various types of communication modules such as a near field communication (NFC) module (not shown), a wireless communication module (not shown), etc. Here, the NFC module (not shown) communicates with the interactive server 200 and an external server (not shown) providing a content and may be a Bluetooth communication module, a Zigbee communication module, or the like. Here, the interactive server 200 and the external server are positioned in a near field. The wireless communication module is connected to an external network according to a wireless communication protocol such as WiFi, Institute of Electrical and Electronics Engineers (IEEE), or the like to perform a communication. The wireless communication module may further include a mobile communication module which accesses a mobile communication network according to various types of mobile communication standards, such as 3rd Generation (3G), 3rd Generation Partnership Project (3GPP), Long term Evolution (LTE), etc., to perform a communication.

The display device 130 may be realized as a liquid crystal display (LCD), an organic light-emitting display (OLED), a plasma display panel (PDP), or the like to provide various types of display screens through the display apparatus 100. In particular, the display device 130 displays a content or content information corresponding to the uttered voice of the user based on the response information received from the interactive server 200.

The controller 140 controls elements of the display apparatus 100. In particular, if the response information including an execution command script generated through a combination of an execution language and a command is received from the interactive server 200, the controller 140 performs an operation based on the execution command script included in the received response information.

If response information of an uttered voice of the user "Search for ooo (content name)." is received from the interactive server 20 as in the above-described example, the controller 140 receives content information of episodes of "ooo(content name)" from the content providing server 300 through the communicator 120 based on an execution command script of the received response information and displays a content list of the content information of the episodes on a screen through the display device 130. In detail, the response information received from the interactive server 200 may include an execution command script "content_search($ooo(content name)$)". Therefore, the controller 140 parses the execution command script "content_search ($ooo(content name)$)" to classify an execution language as "$ooo(content name)$" and a command as "content_search". If the execution language and the command are classified from the execution command script as described above, the controller 140 controls the display device 130 to receive content information of episodes of "ooo (content name)" from the content providing server 300 based on the classified execution language and display a content list of the content information of the episodes on a screen. However, the present general inventive concept is not limited thereto, and thus the communicator 120 may receive response information including content information of episodes of "ooo (content name)" from the interactive server 200. In this case, the controller 140 may display the content information of the episodes of "ooo (content name)" included in the response information received from the interactive server 200 on the screen through the display device 130.

If response information with respect to an uttered voice of a user "Make bedtime reservation." is received from the interactive server 200 as in the another above-described example, the controller 140 automatically sets a bedtime reservation to a preset time based on an execution command script included in the received response information. In detail, the response information received from the interactive server 200 may include an execution command script "device_execute($bedtime reservation$)". Therefore, the controller 140 parses the execution command script "device_execute($bedtime reservation$)" to classify an execution language as "$$bedtime reservation$$" and a command as "device_execute". If the execution language and the command are classified from the execution command script, the controller 140 automatically sets the bedtime reservation to a preset time based on the classified execution language. If the bedtime reservation is automatically set as described above, the controller 140 outputs a text format notification message "Bedtime reservation has been completely set." on the screen through the display device 130 based on the received response information.

As shown in FIG. 4, the display device 130 may receive and display the first content 130 through a channel requested by the user according to a control command of the controller 140. The display device 130 may display the content list 40 of the second content requested by the user on the screen based on a user command. If the content list 40 including the content information 41 through 45 of the episodes of the second content is displayed on the screen as described above, the controller 140 may allocate identification information to each of the content information 41 through 45 of the episodes based on preset priorities. If the first content 30 and the content list 40 of the second content are displayed on the screen, an uttered voice for viewing the second content corresponding to a particular episode may be input from the user. For example, the user may make an utterance "Select third one." to view the second content corresponding to the content information 43 of the third episode. If this uttered voice is input, the controller 140 determines whether utterance history information of the uttered voice "Select third one." has been stored in the storage device 150. Here, the utterance history information may include an uttered voice input from a previous user and time information about when the corresponding uttered voice is input. If it is determined that the utterance history information has not been stored in the storage device 150, the controller 140 transmits uttered information including the uttered voice "Select third one." and the identification information allocated to the content information 41 through 45 of the episodes to the interactive server 200.

If it is determined that the utterance history information has been stored in the storage device 150, the controller 140 acquires the latest utterance history information based on the time information included in the stored utterance history information. The controller 140 determines whether the uttered voice "Select third one." has been input within a preset time based on the time information included in the acquired utterance history information. If it is determined that the uttered voice "Select third one." has been input within the preset time, the controller 140 transmits the uttered voice "Select third one." to the interactive server 200 through the communicator 120. If it is determined that the uttered voice "Select third one." has not been input within the preset time, the controller 140 transmits the uttered information including the uttered voice "Select third one." and the identification information (the above-described execution information) allocated to the content information 41 through 45 of the episodes displayed on the content list 40 to the interactive server 200.

If response information with respect to the uttered voice "Select third one." is received from the interactive server 200, the controller 140 receives the second content corresponding to the content information 43 of the third episode from the content providing server 300 based on the execution command script included in the received response information and displays the second content through the display device 130.

The elements of the display apparatus 100 which recognize an uttered voice of a user and perform operations based on response information corresponding to the recognized uttered voice have been described in detail. A method of controlling the interactive server 200 which provides response information corresponding to an uttered voice of a user and a method of controlling the display apparatus 100 which perform an operation based on response information will now be described in detail.

Figure 6:
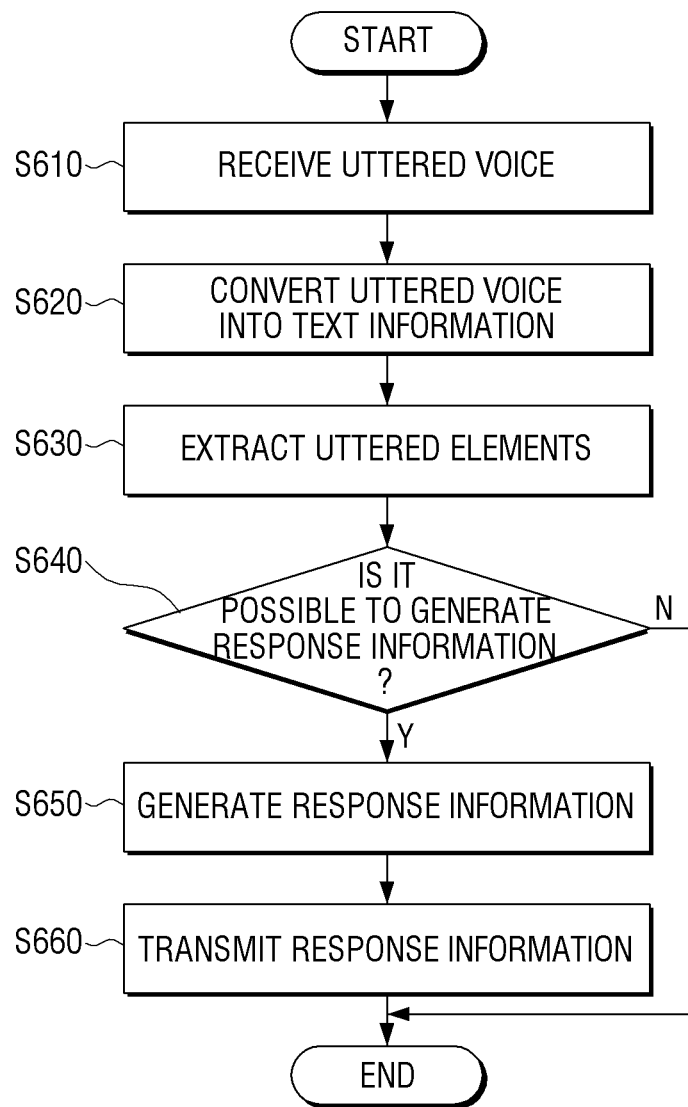
FIG. 6 is a flowchart illustrating a method of controlling an interactive server according to an exemplary embodiment of the present general inventive concept.

FIG. 6 is a flowchart illustrating a method of controlling an interactive server according to an exemplary embodiment of the present general inventive concept.

Referring to FIG. 6, in operation S610, the interactive server 200 receives an uttered voice signal (hereinafter referred to as an uttered voice) from the display apparatus 100. Here, an uttered voice of a user is a voice signal which is converted from an analog voice signal into a digital signal. In operation 620, the interactive server 200 converts the received uttered voice into text information. According to an exemplary embodiment, the interactive server 200 may convert the uttered voice of the user into a text by using an STT algorithm. However, the present general inventive concept is not limited thereto, and thus the interactive server 200 may receive the text information of the uttered voice of the user from the display apparatus 100. In this case, the display apparatus 100 receives the text information of the uttered voice of the user from an automatic speech recognition (ASR) server such as the first server 10 and transmits the text information to the interactive server 200. Therefore, the interactive server 200 may receive the text information of the uttered voice of the user from the display apparatus 100.

If the uttered voice of the user is converted into the text information or the text information of the uttered voice of the user is received from the display apparatus 100, the interactive server 200 extracts uttered elements from the uttered voice converted into the text information in operation S630. In other words, the interactive server 200 extracts a first uttered element indicating a feature and a second uttered element indicating an execution command from the uttered voice converted into the text information. If at least one of the first and second uttered elements is extracted, the interactive server 200 determines whether it is possible to generate response information appropriate for an intention of the user based on the extracted uttered element in operation S640. If it is determined in operation S640 that it is impossible to generate the response information based on the extracted uttered element, the interactive server 200 does not generate the response information from the uttered voice of the user. If it is determined in operation S640 that it is possible to generate the response information based on the extracted uttered element, the interactive server 200 generates the response information from the uttered voice of the user in operation S650. In operation S660, the interactive server 200 transmits the response information to the display apparatus 100.

In detail, if the first and second uttered elements are extracted from the uttered voice of the user, the interactive server 200 determines whether an execution language and a command respectively corresponding to the extracted first and second uttered elements have been stored. Here, the first uttered element is an uttered element indicating a feature, and the second uttered element is an uttered element indicating an execution command. Therefore, the interactive server 200 determines whether an execution language corresponding to the first uttered element indicating the feature and a command corresponding to the second uttered element indicating the execution command have been stored. If it is determined that the execution language and the command respectively corresponding to the extracted first and second uttered elements have been stored, the interactive server 200 combines the execution language and the command respectively corresponding to the extracted first and second uttered elements to generate an execution command script. If it is determined that the execution language and the command respectively corresponding to the extracted first and second uttered elements have not been stored, the interactive server 200 determines whether it is possible to estimate an execution language and a command respectively corresponding to the extracted first and second uttered elements based on stored utterance history information. If it is determined that it is possible to estimate the execution language and the command respectively corresponding to the extracted first and second uttered elements based on the stored utterance history information, the interactive server 200 combines the estimated execution language and command to generate an execution command script. If it is determined that it is impossible to estimate the execution language and the command respectively corresponding to the extracted first and second uttered elements based on the stored utterance history information, the interactive server 200 does not generate the response information of the uttered voice of the user. As described above, the interactive server 200 determines whether it is possible to generate response information of an uttered voice of a user based on uttered elements extracted from the uttered voice of the user and stored utterance history information and transmits the generated response information to the display apparatus 100 according to the determination result.

A method of generating response information based on uttered elements extracted from an uttered voice of a user and stored utterance history information in the interactive server 200 will now be described in detail with reference to FIG. 7.

Figure 7:
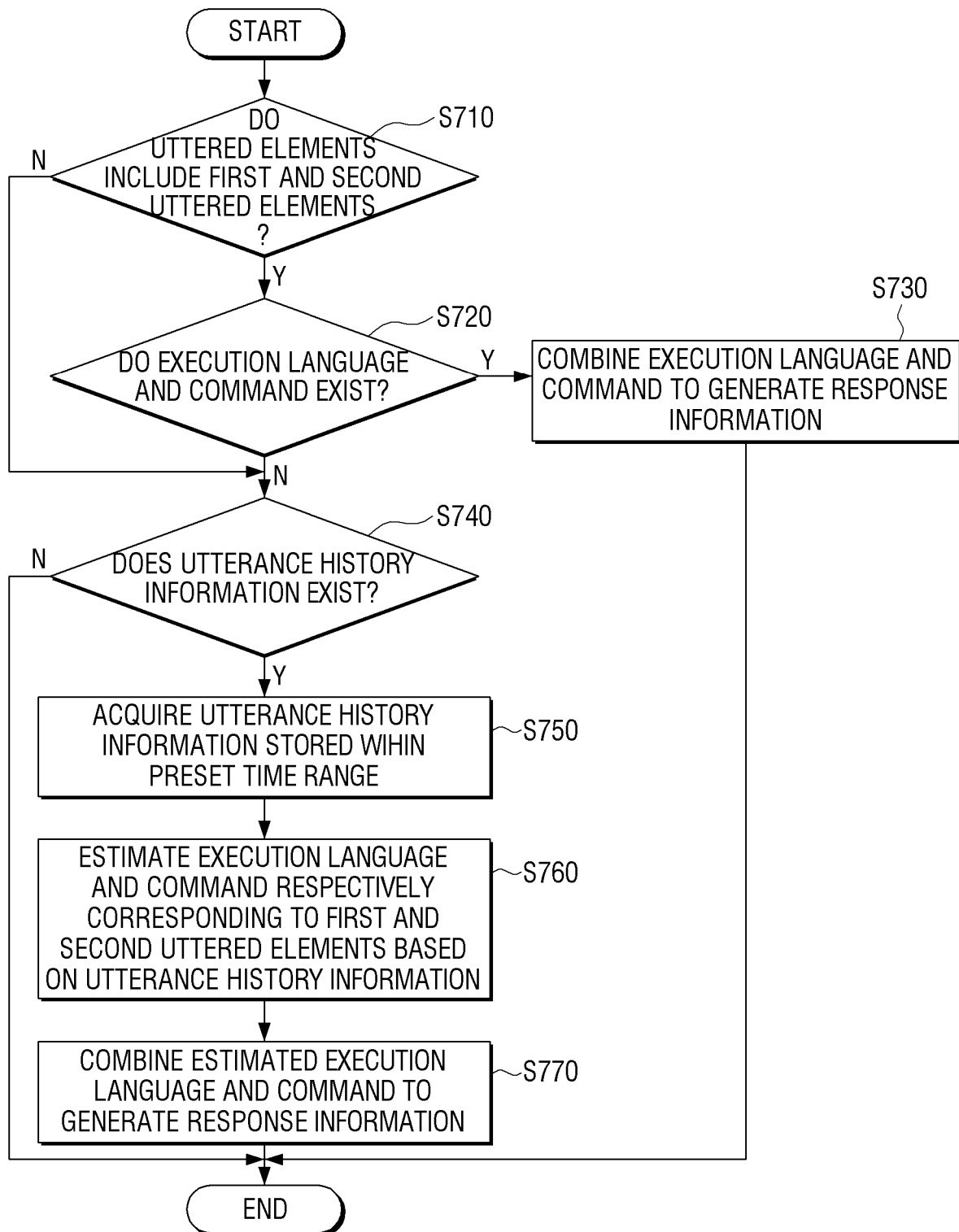
FIG. 7 is a flowchart illustrating a method of generating response information through an interactive server according to an exemplary embodiment of the present general inventive concept.

FIG. 7 is a flowchart illustrating a method of generating response information in an interactive server according to an exemplary embodiment of the present general inventive concept.

Referring to FIG. 7, an uttered voice of a user is converted into text information or an uttered voice converted into text information is received from the display apparatus 100 through operation 620 described above. If the uttered voice of the user is converted into the text information or is received as described above, the interactive server 200 extracts uttered elements from the uttered voice converted into the text information. If the uttered elements are extracted, the interactive server 200 parses the extracted uttered elements to determine whether the uttered elements include a first uttered element indicating a feature and a second uttered element indicating an execution command in operation S710. If it is determined in operation S710 that the extracted uttered elements do not include at least one of the first and second uttered elements, the interactive server 200 determines whether previous utterance history information has been stored through operation S740 that will be described later.

If the first and second uttered elements are extracted from the uttered voice of the user, the interactive server 200 determines whether an execution language and a command respectively corresponding to the extracted first and second uttered elements exist in operation S720. If it is determined in operation S720 that the execution language and the command respectively corresponding to the extracted first and second uttered elements exist, the interactive server 200 combines the execution language and the command respectively corresponding to the extracted first and second uttered elements to generate response information in operation S730. If it is determined in operation S720 that the execution language and the command respectively corresponding to the extracted first and second uttered elements do not exist, the interactive server 200 determines whether utterance history information of the uttered voice exists before the uttered voice of the user is received in operation S740. If it is determined in operation S740 that the utterance history information does not exist, the interactive server 200 does not generate the response information with respect to the uttered voice of the user. If it is determined in operation S740 that the utterance history information exists, the interactive server 200 acquires utterance history information stored within a preset time range based on a time when the uttered voice of the user is received, in operation S750. In operation S760, the interactive server 200 estimates an execution language corresponding to the first uttered element extracted from the uttered voice of the user and a command corresponding to the second uttered element extracted from the uttered voice of the user as an execution language and a command corresponding to the uttered voice of the user within the acquired utterance history information. If the execution language and the command are extracted from the uttered voice of the user as described above, the interactive server 200 combines the estimated execution language and command to generate response information in operation S770.

A method of generating response information of an uttered voice of a user in the interactive server 200 if uttered elements extracted from the uttered voice of the user do not include at least one of first and second uttered elements will now be described.

For example, the interactive server 200 does not extract first and second uttered elements from an uttered voice "Yes." In this case, the interactive server 200 determines that the uttered voice "Yes." is unclear and acquires previous utterance history information stored within a preset time range from stored utterance history information based on a time when the uttered voice "Yes." is received. For example, if an uttered voice included in the acquired previous utterance history information is "Turn off TV.", the interactive server 200 extracts a first uttered element "TV" and a second uttered element "Turn off". The interactive server 200 estimates the currently received uttered voice "Yes." as "confirm" based on the extracted first and second uttered elements. Therefore, the interactive server 200 determines that an execution area is a device control based on the first uttered element "TV" extracted from the previous utterance history information. The interactive server 200 acquires an execution language "$TV$" corresponding to the first uttered element "TV" with reference to execution languages defined according to stored first uttered elements. The interactive server 200 determines that a type of the second uttered element "Turn off" is related to a device function execution based on the execution area determined as the device control. Therefore, the interactive server 200 acquires a command corresponding to the device function execution from commands defined according to stored second uttered elements. The interactive server 200 acquires a command "device_execute_turn off" corresponding to a power control from the commands acquired to correspond to the device function execution. The interactive server 200 combines the execution language "$TV$" and the command "device_execute_turn off" corresponding to the second uttered element to generate an execution command script "device_execute_turn off($TV$)". If the execution command script is generated as described above, the interactive server 200 generates response information including the generated execution command script.

A method of generating response information of an uttered voice of a user in the interactive server 200 if an execution language and a command respectively corresponding to first and second uttered elements extracted from the uttered voice of the user exist will now be described.

If an uttered voice "Search for ooo (content name)" is input, the interactive server 200 extracts a first uttered element "ooo (content name)" and a second uttered element "Search" from the uttered voice "Search for ooo (content name)". If the first and second uttered elements are extracted as described above, the interactive server 200 determines that an execution area is a content based on the extracted first uttered element. The interactive server 200 acquires an execution language "$ooo(content name)$" corresponding to the first uttered element "ooo (content name)" from commands defined according to stored first uttered elements. The interactive server 200 determines that a type of the second uttered element "Search" is related to a content search based on the execution area determined as the content. Therefore, the interactive server 200 acquires a command "content_search" corresponding to the content search from commands defined according to stored second uttered elements.

If the execution language and the command respectively corresponding to the first and second uttered elements are acquired as described above, the interactive server 200 combines the execution language "$○○○(content name)$" and the command "content_search" to generate an execution command script "content_search($○○○(content name)$)". If the execution command script is generated, the interactive server 200 generates response information including the generated execution command script.

A method of generating response information of an uttered voice of a user in the interactive server 200 if an execution language and a command respectively corresponding to first and second uttered elements extracted from the uttered voice of the user exist, will now be described.

For example, interactive server 200 may extract a first uttered element "first one" and a second uttered element "Select" from an uttered voice "Select first one." If the first and second uttered elements are extracted as described above, the interactive server 200 determines whether an execution language and a command respectively corresponding to the first and second uttered elements have been stored. In detail, the interactive server 200 acquires an execution language "$1st$" corresponding to the first uttered element "first one" with reference to execution languages defined according to stored first uttered elements. The interactive server 200 determines whether it is possible to determine an execution area based on the extracted first uttered element. If it is determined that it is impossible to determine the execution area based on the first uttered element "first one", the interactive server 200 does not acquire a command corresponding to the second uttered element "Select" from commands defined according to stored second uttered elements. Therefore, the interactive server 200 determines that an execution area and an execution command for providing a service of the uttered voice is unclear from the uttered voice "Select first one." According to the determination result, the interactive server 200 determines whether stored utterance history information includes utterance history information stored within a preset time range based on a time when the voice "Select first one." was uttered. In other words, the interactive server 200 determines whether a time difference between the time when the uttered voice "Select first one." and the latest stored previous utterance history information belongs to a preset time range, among the stored utterance history information. If it is determined that the latest stored previous utterance history information does not belong to the preset time range, the interactive server 200 does not generate response information of the uttered voice "Select first one." If it is determined that the latest stored previous utterance history information belongs to the preset time range, the interactive server 200 extracts first and second uttered elements from text information of the uttered voice included in the previous utterance history information.

For example, if an uttered voice included in previous utterance history information is "○○○ (content name)", the interactive server 200 extracts a first uttered element "○○○ (content name)" and a second uttered element "Search". The interactive server 200 estimates the first uttered element "first one" as the first uttered element "○○○(content name)" based on the first uttered element "○○○(content name)" of the first and second uttered elements extracted from the uttered voice included in the previous utterance history information. The interactive server 200 determines that an execution area is a device UI control based on the estimated first uttered element and acquires a command "device_select" corresponding to the device UI control from commands defined according to stored second uttered elements. The interactive server 200 combines the execution language "$1st$" corresponding to the acquired first uttered element and the command "device_select" corresponding to the second uttered element to generate an execution command script "device_select($1st$)". If the execution command script is generated, the interactive server 200 generates response information including the generated execution command script.

As described above, the interactive server 200 according to the present general inventive concept parses an uttered voice of a user to comprehend an intention of the user and determines whether it is possible to generate response information based on the comprehended uttered intention of the user. If it is determined that it is impossible to generate the response information based on the uttered intention of the user, the interactive server 200 generates response information of a currently uttered voice of the user based on a previously uttered voice of the user. Therefore, the user makes an utterance in a manner the user wants to express without being limited to a particular utterance, to be provided with a service of the utterance.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a voice input receiver;
a display;
a communicator configured to communicate with a server; and
one or more processors configured to:
receive a first user voice input through the voice input receiver while a content is displayed on the display,
based on the received first user voice input including a first uttered element and a second uttered element, receive first data corresponding to a combination of the first uttered element and the second uttered element from the server through the communicator and control the display to display first information corresponding to the received first data,
and
based on the received first user voice input including a first uttered element without a second uttered element, control the display to display second information based on the first user voice input and voice history information,
wherein the voice history information includes information generated based on a second user voice input received during a predetermined time prior to the first user voice input,
wherein the first uttered element corresponds to an execution object, and the second uttered element corresponds to an execution command.

2. The display apparatus of claim 1, wherein the execution object is an uttered element corresponding to an object indicated by the first user voice input, and wherein the execution command is an uttered element corresponding to an operation indicated by the first user voice input to be performed on the object.

3. The display apparatus of claim 1, wherein, based on whether or not the second uttered element corresponding to the execution command is included in the first user voice input, the displayed response information corresponding to the first user voice input is different.

4. The display apparatus of claim 1, wherein, based on the first user voice input corresponding to controlling a function of the display apparatus and including an execution object and a execution command, the one or more processors is further configured to:
receive a command corresponding to the controlling the function of the display apparatus from the server through the communicator, and
control the function of the display apparatus corresponding to the received command.

5. The display apparatus of claim 1, wherein the first user voice input is received within the predetermined time from when the second user voice input is received.

6. The display apparatus of claim 1,
wherein, based on non-inclusion of the second uttered element corresponds to the execution command, the execution command is obtained based on the voice history information, and
wherein the one or more processors is further configured to control the display to display the response information based on a combination of the first uttered element and the obtained the command.

7. The display apparatus of claim 6, wherein the one or more processors is further configured to:
receive the first data corresponding to the combination of the first uttered element and the obtained the execution command from the server through the communicator, and
control the display to display the response information corresponding to the received first data.

8. The display apparatus of claim 1, wherein, based on the first user voice input, including the execution object and the execution command, corresponding to searching a content, the one or more processors is further configured to:
receive second data corresponding to the content from the server through the communicator, and
control the display to display a content list corresponding to the received second data.

9. The display apparatus of claim 8, wherein the execution object included in the first user voice input corresponds to a content title to be searched.

10. A method of controlling a display apparatus, the method comprising:
receiving a first user voice input while a content is displayed;
based on the received first user voice input including a first uttered element and a second uttered element, receiving first data corresponding to a combination of the first uttered element and the second uttered element from the server and displaying first information corresponding to the received first data; and
based on the received first user voice input including a first uttered element without a second uttered element, displaying second information based on the first user voice input and voice history information,
wherein the voice history information includes information generated based on second user voice input received during a predetermined time prior to the first user voice input,
wherein the first uttered element corresponds to an execution object, and the second uttered element corresponds to an execution command.

11. The method of claim 10, wherein the execution object is an uttered element corresponding to an object indicated by the first user voice input, and the execution command is an uttered element corresponding to an operation indicated by the first user voice input to be performed on the object.

12. The method of claim 10, wherein, based on whether or not the second uttered element corresponding to the execution command is included in the first user voice input, the displayed response information corresponding to the first user voice input is different.

13. The method of claim 10, wherein, based on the first user voice input corresponding to controlling a function of the display apparatus and including an execution object and a execution command, the method comprising:
receiving a command corresponding to the controlling the function of the display apparatus from the server through the communicator, and
controlling the function of the display apparatus corresponding to the received command.

14. The method of claim 10, wherein the first user voice input is received within the predetermined time from when the second user voice input is received.

15. The method of claim 10,
wherein, based on non-inclusion of the second uttered element corresponds to the execution command, the execution command is obtained based on the voice history information, and
wherein the displaying second information comprises displaying the response information based on a combination of the first uttered element and the obtained the command.

16. The method of claim 15, further comprising:
receiving the first data corresponding to the combination of the first uttered element and the obtained the execution command from the server, and
displaying the response information corresponding to the received first data.

17. The method of claim 10, wherein, based on the first user voice input, including the execution object and the execution command, corresponding to searching a content, the method comprising:
receiving second data corresponding to the content from the server through the communicator, and
displaying a content list corresponding to the received second data.

18. The method of claim 17, wherein the execution object included in the first user voice input corresponds to a content title to be searched.

* * * * *